United States Patent [19]

Cole et al.

[11] Patent Number: 5,752,042

[45] Date of Patent: May 12, 1998

[54] SERVER COMPUTER FOR SELECTING PROGRAM UPDATES FOR A CLIENT COMPUTER BASED ON RESULTS OF RECOGNIZER PROGRAM(S) FURNISHED TO THE CLIENT COMPUTER

[75] Inventors: Gary Lee Cole, Endicott; Scott Phillip Engleman, Vestal; Steven Michael Pritko, Endicott, all of N.Y.

[73] Assignee: International Business Machines Corporation, Armonk, N.Y.

[21] Appl. No.: 659,841

[22] Filed: Jun. 7, 1996

[51] Int. Cl.⁶ .................................................. G06F 15/177
[52] U.S. Cl. ................ 395/712; 395/703; 395/200.49; 395/200.51; 707/203
[58] Field of Search ........................... 395/712, 610, 395/619, 200.01, 200.09, 703, 200.49, 200.51; 707/203

[56] References Cited

U.S. PATENT DOCUMENTS

| | | | |
|---|---|---|---|
| 4,558,413 | 12/1985 | Schmidt et al. | 707/203 |
| 4,714,995 | 12/1987 | Materna et al. | 707/201 |
| 5,005,122 | 4/1991 | Griffin et al. | 395/200.33 |
| 5,019,963 | 5/1991 | Anderson et al. | 707/201 |
| 5,133,075 | 7/1992 | Risch | 707/201 |
| 5,155,847 | 10/1992 | Kirouac et al. | 395/200.51 |
| 5,339,430 | 8/1994 | Lundin et al. | 395/201 |
| 5,452,448 | 9/1995 | Sakuraba et al. | 707/201 |
| 5,473,772 | 12/1995 | Halliwell et al. | 395/712 |
| 5,491,820 | 2/1996 | Belove et al. | 707/3 |
| 5,495,610 | 2/1996 | Shing et al. | 395/200.51 |
| 5,553,282 | 9/1996 | Parrish et al. | 707/10 |
| 5,581,764 | 12/1996 | Fitzgerald et al. | 395/703 |
| 5,619,716 | 4/1997 | Nonalca et al. | 395/712 |

FOREIGN PATENT DOCUMENTS

| | | |
|---|---|---|
| 20280 | 1/1993 | Japan . |
| 129407 | 5/1995 | Japan . |
| 175641 | 7/1995 | Japan . |
| 225724 | 8/1995 | Japan . |
| 7295830 | 11/1995 | Japan . |

OTHER PUBLICATIONS

IBM Technical Disclosure Bulletin vol. 38, No. 12, 12–95, p. 479, "Disk Drive With Embedded Hyper-Text Markup Language Server".

Copies of "Surfin' Service" transparency foils.

*Primary Examiner*—Kenneth S. Kim
*Attorney, Agent, or Firm*—Arthur J. Samodovitz

[57] ABSTRACT

A server computer selects code updates to download to a client computer. The server computer identifies code updates which are consistent with basic system characteristics of the client computer. Then, the server computer sends to the client computer one or more "recognizer" programs or one or more addresses outside of the client computer of the one or more recognizer programs which execute in the client computer to determine whether the client computer has a version other than a current version of the identified code updates. The client sends the results to the server computer which generates a list of code updates which are consistent with the basic system characteristics, representing programs that exist on the client computer for which an update would be appropriate. Next, the server computer sends the list or information about the list to the client computer. A user at the client computer selects from the list and sends the selections to the server computer. In response, the server computer sends addresses of the selected code updates to the client computer and the client computer downloads the selected code updates from a content server. At some later time, the recognizer programs corresponding to the selected code updates are executed again before the selected code updates are installed in the client computer.

30 Claims, 6 Drawing Sheets

SERVER COMPUTER FOR SELECTING PROGRAM UPDATES FOR A CLIENT COMPUTER BASED ON RESULTS OF RECOGNIZER PROGRAM(S) FURNISHED TO THE CLIENT COMPUTER

BACKGROUND OF THE INVENTION

The invention relates generally to computer networks and deals more particularly with a technique for selecting code updates stored in a server for installation in a client.

A computer includes hardware and programs such as an operating system and applications. Often times, after a program is installed, there are subsequent code "fixes", new versions and revisions (collectively called "updates"). The updates may comprise a replacement of a single file of the program or replacement of the entire program. Typically the update also includes a short routine to actually install the updated code in the client. The installation routine typically replaces files in the existing program with new files from the update.

The "Internet" is well known today and comprises user/client computers connected via modems and communication lines to one or more servers and respective data bases. Servers provide a wide variety of services to the clients such as routing of electronic mail, news service, management of web pages and web sites, management of code updates, etc. The data bases include actual data, code updates and meta data which describes the actual data and code updates.

There are various known techniques for a server to provide a client with a code update. In one technique, clients register with the server for updates to a particular program, and whenever the server obtains a new update for that program, the server automatically sends the code update to every client on the list. Unfortunately, some clients may not wish to obtain the update because of cost, download time or other reason. Alternately, a client can periodically request all updates and the server will respond accordingly. Unfortunately again, the client may not need every code update but nevertheless, endures the cost and download time.

A general object of the present invention is to provide a method and system for selecting code updates for a client.

SUMMARY OF THE INVENTION

The invention resides in server and client computers for selecting code updates to download to the client computer. The server computer identifies code updates which are consistent with basic system characteristics of the client computer. Then, the server computer sends to the client computer one or more "recognizer" programs or one or more addresses outside of the client computer of the one or more recognizer programs which execute in the client computer to determine whether the client computer has a version other than a current version of the identified code updates. The client sends the results to the server computer which generates a list of code updates which are consistent with the basic system characteristics representing programs that exist on the client computer for which an update would be appropriate. Next, the server computer sends the list or information about the list to the client computer. A user at the client computer selects from the list and sends the selections to the server computer. In response, the server computer sends addresses of the selected code updates to the client computer and the client computer downloads the selected code updates from a server computer.

According to one feature of the present invention, the server sends an address of one of the "recognizer" programs for each of the code updates that is consistent with the basic system characteristics of the client computer.

According to another feature of the present invention, the information about the list comprises a category designating all updates which are consistent with but not currently resident in said client, and another category designating only critical updates.

According to still another feature of the present invention, the recognizer programs corresponding to the selected code updates are executed again before the selected code updates are installed in the client computer.

DETAILED DESCRIPTION OF THE PREFERRED EMBODIMENTS

Figure 1:
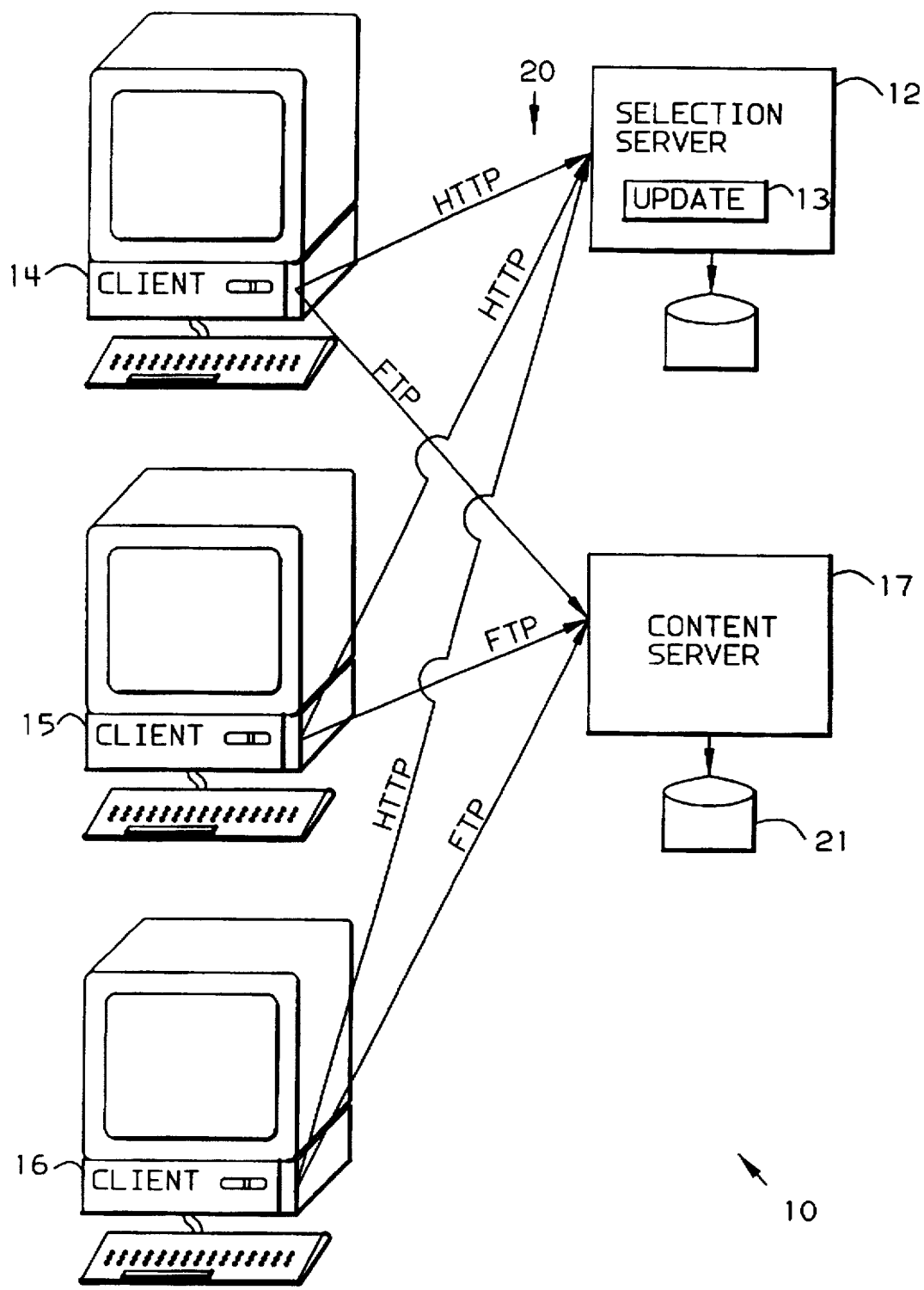
FIG. 1 illustrates a computer network which incorporates the present invention.

Referring now to the drawings in detail wherein like reference numbers indicate like elements throughout, FIG. 1 illustrates a computer network generally designated 10 according to the present invention. Network 10 comprises a selection server 12 with a data base 13, a content server 17, clients 14–16 and an Internet 20 to interconnect the servers and clients. By way of example, the selection server 12 comprises a computer workstation, associated programming and a modem, the content server 17 comprises a computer workstation, associated programming and a modem and each of the clients 14–16 comprises a personal computer, associated programming and a modem. The Internet comprises a communication medium such as telephone wires between the clients 14–16, the selection server 12 and the content server 17 and programming to manage the communications. Communications between the clients and the selection server 12 utilize hypertext transport protocol (HTTP) and communications between the clients and the content server 17 utilize file transport protocol (FTP). Although not shown, there are many other servers for the Internet. Selection server 12 is dedicated to automating selection of code updates, the content server 17 includes the actual code updates (stored on disk 21), and data base 13 includes meta data for the code updates and FTP addressing information to locate the code updates in content server 17. The meta data provides descriptive information about the respective code updates such as Bios level, pre-load level, motherboard ID, etc. The FTP addressing information indicates the address or identification of the content server which stores the respective code update (content server 17 in the illustrated example), a user ID and password to log-on to the content server, a name of the code update, a list of files which comprise the code update and the size, checksum and directory of each file.

The process for storing the updates in the content server 17 and the meta data in the selection server 12 are not critical to the present invention. However, according to one process, a person writes the code update and meta data and loads them into the content server 17, either via the Internet or by manual loading. The code updates remain stored in the content server, but the meta data is written to the selection server, either via the Internet or by manual loading.

Figure 2:
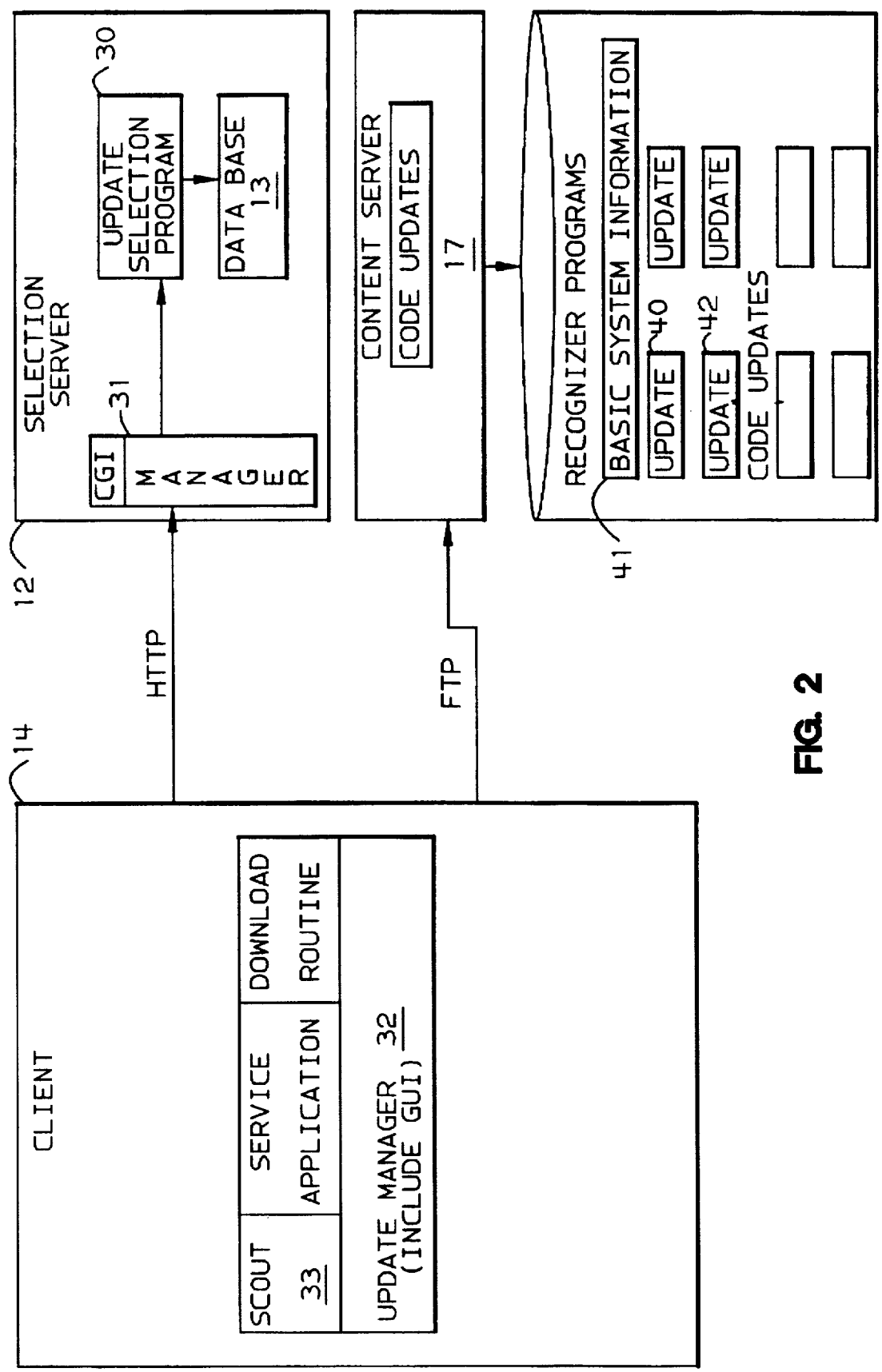
FIG. 2 is a block diagram of a selection server, content server and a client in the network of FIG. 1, which server and client are programmed according to the present invention.
Figure 3A:
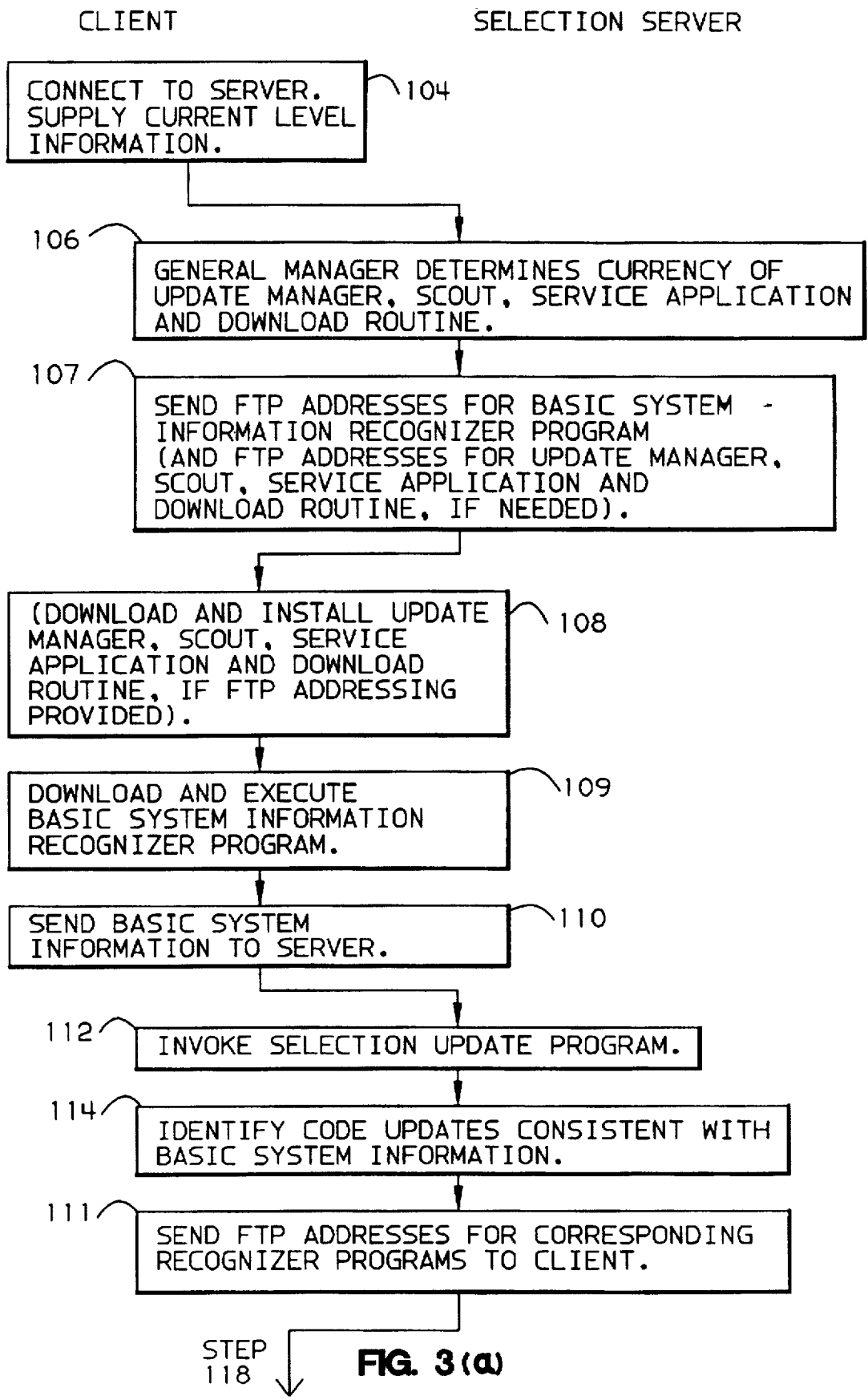
FIGS. 3a and 3b form a flow chart illustrating operation of the client and server of FIG. 2.
Figure 3:
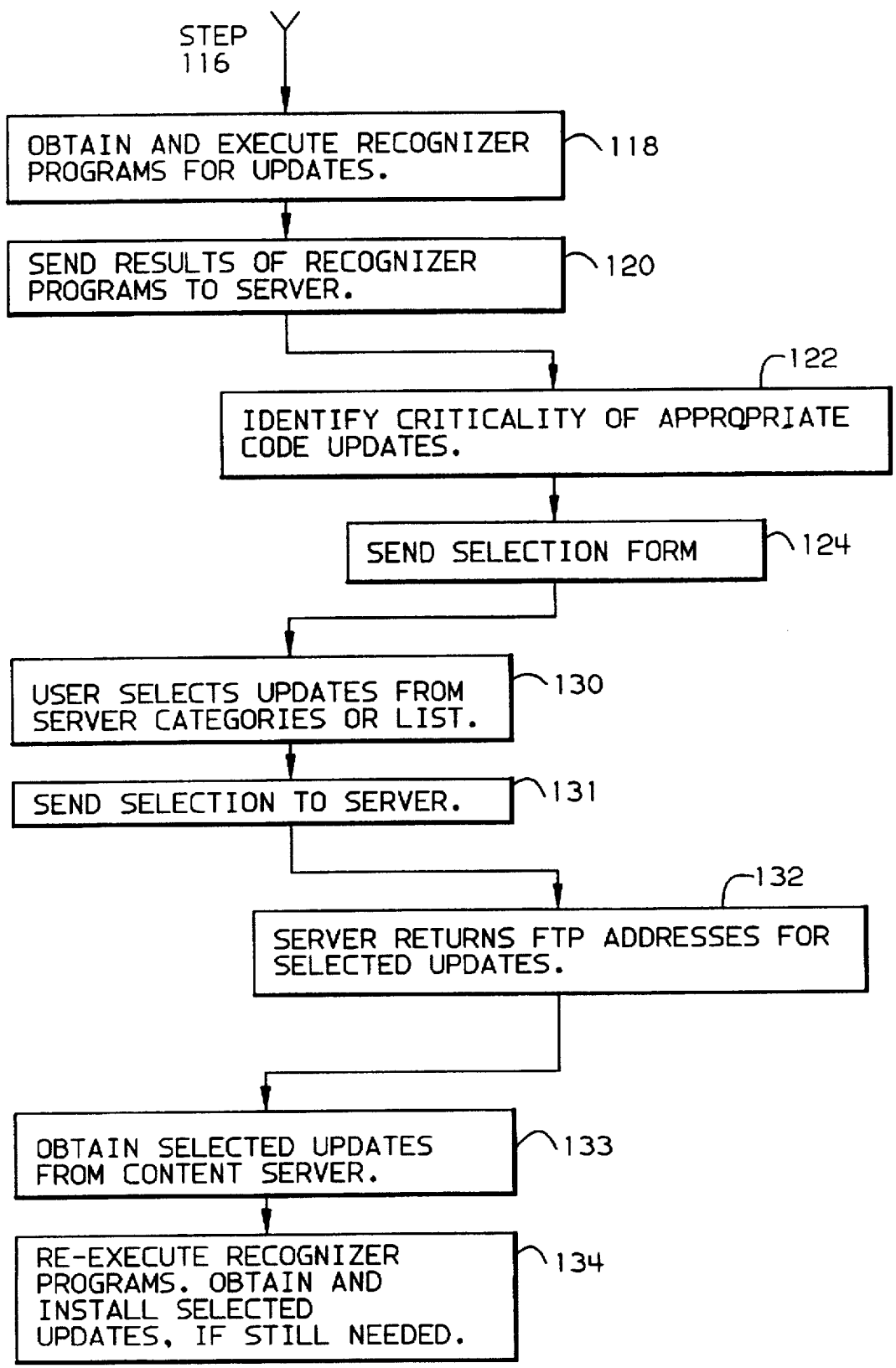

As illustrated in FIG. 2, the selection server 12 is an http server with an associated "CGI" program 31 and includes an update selection program 30. The client 14 includes an update manager program 32 (including a GUI), a scout routine 33, a service application routine 34 and a download routine 39. The functions of the server and client programming and a typical client/server session for selecting and downloading updates are illustrated in FIGS. 3(a,b). A user at client computer 14 selects an icon to invoke update manager 32. In response, the update manager contacts the general manager 31 in server 12 to begin a session and supplies the current level of update manager 32, scout 33, service application 34 and download routine 39 within client 14 (step 104). In response, the general manager 31 determines if the client's update manager 32, scout 33, service application 12 and download routine 39 are the latest version (step 106). This determination is performed by comparing the client level information supplied by the client 14 to the data in selection server 12 for the latest version of the client's update manager 32, scout 33, service application 34 and download routine 39 stored in the content server 17.

If the client's update manager, scout, service application and download routine are not the latest version, the server sends the FTP addressing information to the client to allow the client to retrieve the latest versions from a content server. Along with the FTP addressing for the client update manager, scout, service application and download routine, the server sends FTP addressing information to the client for a basic system information recognizer program 41 stored in content server 17 (step 107). Next, the client downloads and installs the latest version of the client update manager, scout, service application and download routine from the content server if the FTP addressing was provided (step 108).

The furnishing of the FTP addressing information for the basic system information recognizer program begins the selection process according to the present invention. The client next downloads the basic system information recognizer program 41 from the content server and executes it (step 109). The basic system information recognizer program then obtains basic system information using scout APIs, about client 14 (step 108). The basic system information comprises system model, pre-load software level, BIOS level, and information that is not likely to change often such as type of operating system. For example, the basic system information of client 14 is BIOS level 123, BIOS date Jan. 1, 1996 and mother board ID XYZ. The update manager routine 32 then sends the basic system information, obtained by the recognizer program, to the selection server 12 (step 110).

This initiates the selection update program 30 (step 112). The selection update program 30 within server 12 then determines which code updates are consistent with the basic system information of the client and which code updates are inconsistent thereby eliminating the vast majority of the code updates stored in content server 17 (and other content servers, if any) from further consideration (step 114). In the illustrated embodiment, this determination is made by correlating the meta data in data base 13 to the basic system information obtained from client 14. Matches between the meta data and the basic system information indicate that the corresponding code updates are potentially appropriate for client 14. (In practice, the meta data can be arranged in a relational data base to facilitate the correlation). The first two columns of the following table list code updates available in content server 17 and the meta data for these code updates. The first two columns of this table are used for the initial correlation of the basic system information obtained from client 14 to the meta data (column 2) stored in selection server 12.

| Code Updates | Basis System Information/ Meta Data |
| --- | --- |
| Device Driver ABCDE.DRV | BIOS Level 123 BIOS date 1/1/96 Mother Board ID XYZ |
| Netcomber 2.0 | BIOS Level 123 BIOS date 1/1/96 Mother Board ID XYZ |
| Device Driver FGHIJ.DRV | BIOS Level 456 BIOS date 2/1/96 Mother Board ID XYZ |

In this example, the BIOS level 123, BIOS date Jan. 1, 1996 and mother board ID XYZ basic system information obtained from client 14 is consistent with a device driver file named ABCDE.DRV, and Netcomber (trademark of International Business Machines Corporation) version 2.0. However, device driver file named FGHIJ.DRV requires BIOS level 456 so is inconsistent with the basic system information obtained from client 14 and is eliminated from further consideration.

For each code update, such as device driver file named ABCDE.DRV, and Netcomber program version 2.0, which is consistent with the basic system information of client 14, the selection update program 30 sends to the client 14 the FTP addressing information of a corresponding recognizer program, such as recognizer programs 40 and 42, respectively (step 116). However, the FTP addressing information is not provided (and no recognizer program is fetched) to client 14 for the device driver file named FGHIJ.DRV, because file FGHIJ.DRV is not consistent with the basic system information of client 14. From the FTP addressing information, the client 14 downloads the actual recognizer programs from the content server 17 (step 118).

Each recognizer program is executable and small, typically 2,000–3,000 bytes. Consequently, each recognizer program can be downloaded from content server 17 to the client 14 in seconds (whereas the corresponding code update is much larger and may take hours to download).

It should be noted that based on the basic system information alone, the selection update program 30 within server 12 is not sure which of the code updates that are consistent with the basic system information are actually needed by the client; for example, the client may already have the latest version.

Next, the client 14 executes each recognizer program 40 and 42 with assistance from the scout 33 (step 118). The scout 33 assists the recognizer programs by providing subroutines callable by the recognizer programs. For files required by the recognizer programs, these callable subroutines locate the files, determine the version of the files, determine the length of the file, identify a directory which lists the files, obtain time stamps for the files, obtain data from inside the files and obtain data from a program registry.

This further reduces the requisite length of each recognizer program and therefore shortens the download time. When executed, each recognizer program further investigates the hardware, software and other components of the client 14 for information to assist the server in determining whether the corresponding code update is appropriate for the client 14. For example, this investigation reveals if the client 14 already has these code updates as follows. A recognizer program could also determine if the corresponding code update is consistent with aspects of the client other than the basic system information, such as other programs within the client.

Recognizer program 40 determines from the scout routine 33 in client 14 if the size of file ABCDE.DRV. stored by the client 14 is the same as the size of file ABCDE.DRV. stored in the data base 13. If so, then client 14 has the latest update. If not, then client 14 likely has an old version which could be updated.

Figure 4:
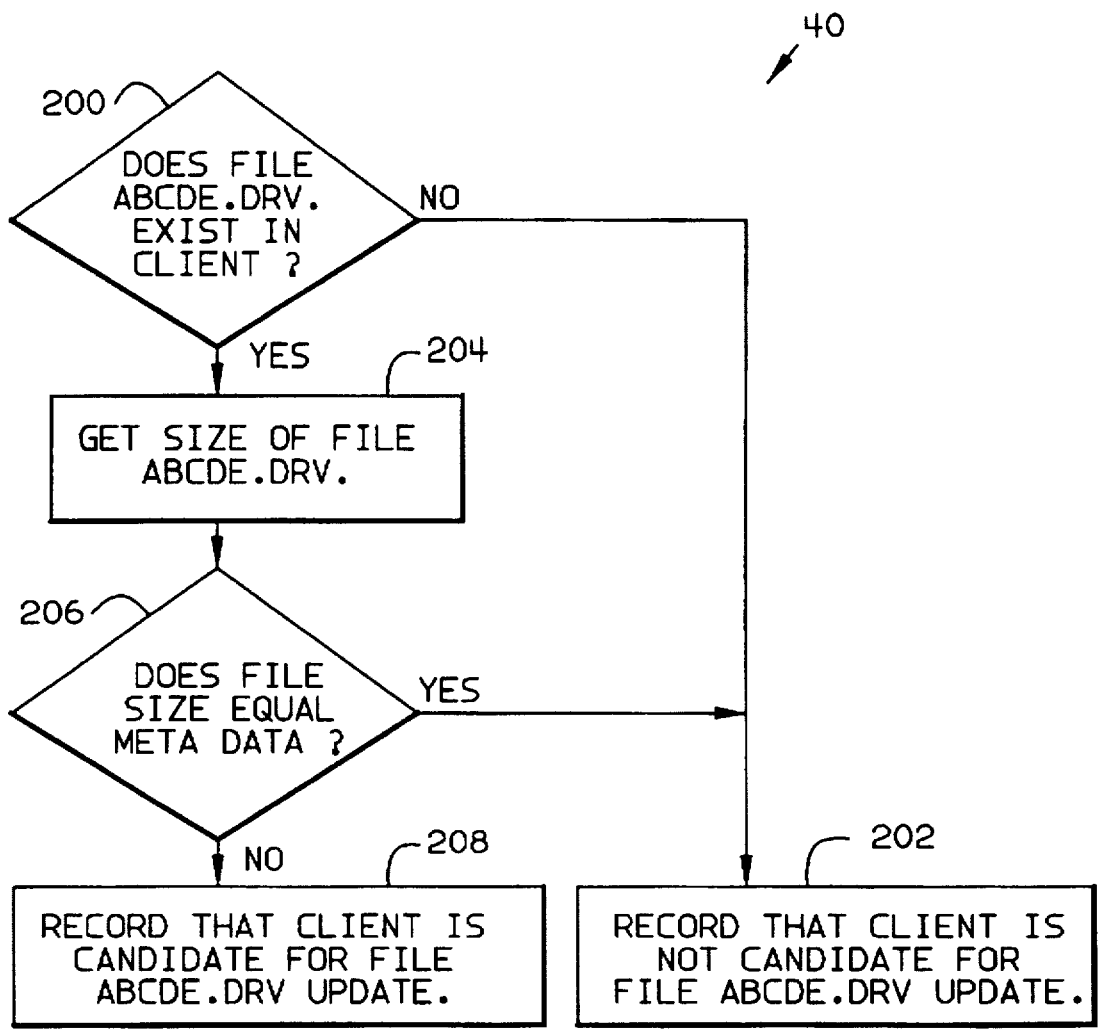
FIG. 4 is a flow chart illustrating a program sent from the server to the client of FIG. 2 to determine needs of the client for a particular code update.

FIG. 4 illustrates recognizer program 40 in more detail. In step 200, recognizer program 40 calls scout 33 to scan client 14's hard disk for file ABCDE.DRV to determine if file ABCDE.DRV exists in client 14. If not, the recognizer program provides an indication that file ABCDE.DRV is not appropriate for client 14 (step 202). However, if file ABCDE.DRV exists in client 14, then recognizer program 40 calls scout 33 to retrieve the size of file ABCDE.DRV in client 14 (step 204), and then compares the file size to the size of the latest version stored in the content server (decision 206). (The recognizer program includes an indication of the size of the corresponding update in the content server.) If the two sizes are the same, then there is no need to download file ABCDE.DRV from the content server 17; client 14 already has the latest version. However, if the two sizes are not the same, then recognizer program 40 makes a record that the file ABCDE.DRV stored in the content server 17 is appropriate for client 14 (step 208).

Recognizer program 42 compares a version number of the Netcomber program in the client to the version number of the Netcomber program of the code update, and if the version number of the Netcomber program installed in client 14 is less, then the client likely has an old version.

Figure 5:
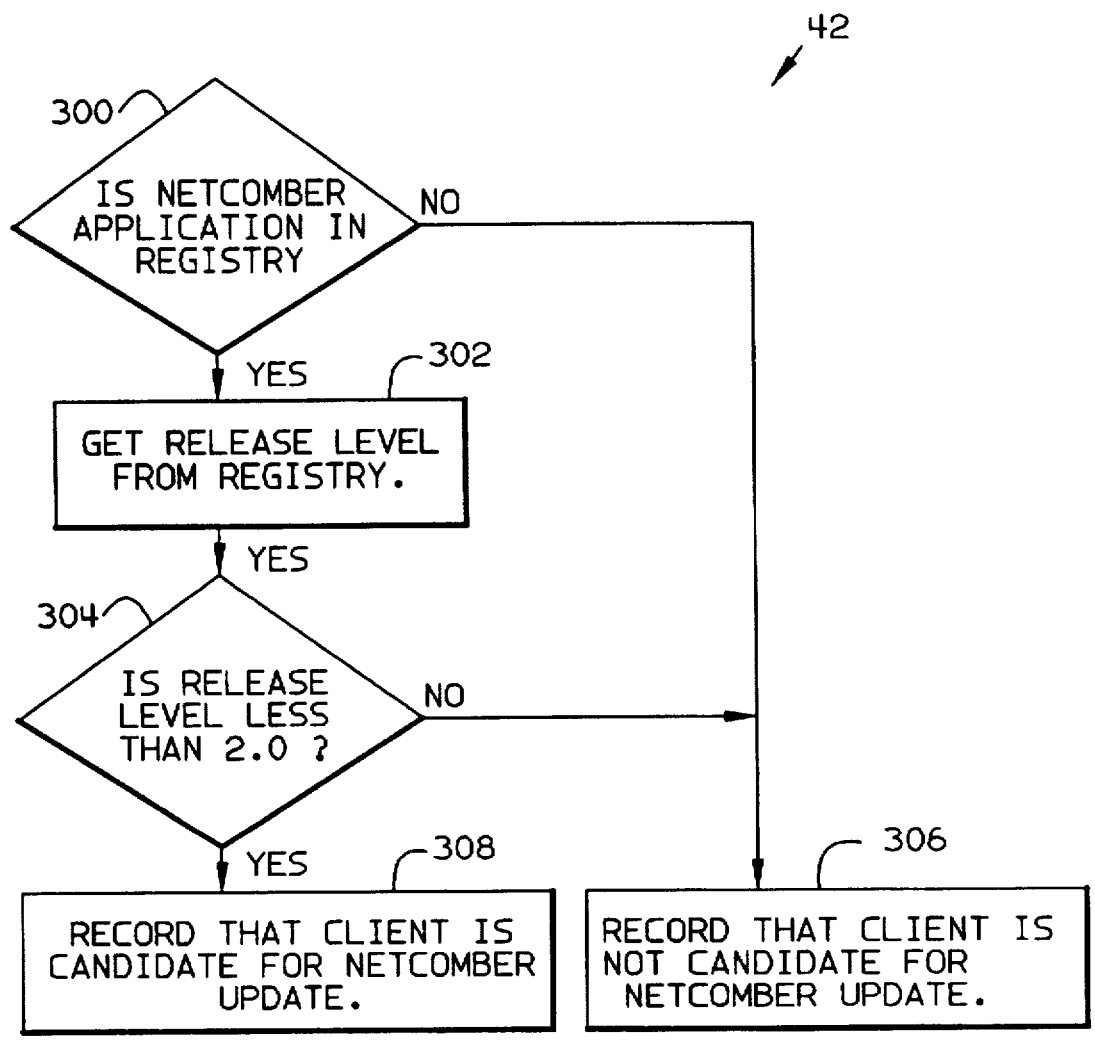
FIG. 5 is another flow chart illustrating a program sent from the server to the client of FIG. 2 to determine needs of the client for another particular code update.

FIG. 5 illustrates recognizer program 42 in more detail. In step 300, recognizer program 42 calls scout 33 to read a data base in client 14 to determine if the Netcomber program exists in client 14. If it does, recognizer program 42 calls scout 33 to obtain the version number of the Netcomber program from the data base (step 302). If the version number stored in the data base is equal to or greater than the version number in the recognizer program, then client 14 does not need the version stored in the content server 17 (decision 304 and step 306). However, if the version number stored in the data base is less than the version number in the recognizer program, then the recognizer program records that client 14 needs the copy of the Netcomber program stored in the content server 17 (decision 304 and step 308).

The results of the recognizer programs include yes/no answers whether each respective code update is appropriate for the client, i.e. not currently resident in client 14 (and consistent with the client basic system information as determined previously in step 114). The recognizer programs can also assign a "critical" level to each code update based on the need of the client for the update. For example, if another program in the client needs this code update to function, then this code update would be assigned a high level of criticality. After the recognizer programs are executed in client 14, client 14 sends to selection server 12 a list of the code updates which are appropriate for the client (step 120).

Based on the information gathered by the recognizer programs, the server determines the level of criticality of the respective code updates and builds a selection form for display at the client (step 122). The selection form comprises a list of the code updates that are consistent with the basic system information and appropriate for the client 14, and a display of the following three selection choices 124 (step 124):

1. minimum number of code updates—code updates which are necessary for the client to ensure compatibility between programs within the client and fix a significant "bug" in a program within the client, and those other updates that the author of the code update deemed critical such as replacement of unsupported programs.
2. maximum number of code updates—all code updates which are consistent with the basic system information and appropriate for the client.
3. client selection of specific code updates—user selects particular code updates from the list of all code updates which are consistent with the basic system information and appropriate for the client.

Next, the client makes a selection, either selection of the first or second categories or an itemized list of code updates pursuant to the third category (step 130), and sends the selection to the server (step 131). In response, the server 12 sends to the client 14 the FTP addressing information for the selected code updates (step 132). Using this FTP addressing information, the download routine 39 of the client downloads the code updates from the content server 17 (step 133). (In the preferred embodiment of the present invention, the FTP addressing information for all code updates represented in the selection form are passed with the selection form to the client 14 in step 124.)

As the code updates are being downloaded, the download routine also records status information (such as the FTP addresses) of the code updates in case of interruption to the communication line. If there is such an interruption, the downloading can continue later where it left off. Since the interruption could be lengthy and the system characteristics could have been altered, immediately before the selected code updates are actually installed, the update manager 32 invokes the corresponding recognizer programs again to ensure that the code updates are still required; it is possible that changes could have occurred to the client since the recognizer programs were previously executed. If the code updates are still appropriate, the service application routine of client 14 installs the code updates in the client 14 as follows (step 134). For every code update file whose stale version is not currently in use by client 14, the service application routine replaces the stale file with the updated file. The update manager also lists each code update file whose stale version is currently in use. Then, the client is requested to re-boot, and the operating system installs the listed code updates during the re-boot.

Based on the foregoing, a technique for selecting and transferring code updates to a client has been disclosed. However, numerous modifications and substitutions can be made without deviating from the scope of the present invention.

Therefore, the present invention has been disclosed by way of illustration and not limitation and reference should be made to the following claims to determine the scope of the present invention.

We claim:

1. A server computer for selecting code updates to download to a client computer, said server computer comprising:

means for identifying code updates which are consistent with basic system characteristics of the client computer;

means for sending to said client computer one or more programs which execute in said client computer to determine whether said client computer has a version other than a current version of the identified code updates;

means for receiving results of said programs, generating a list of code updates which are consistent with said basic system characteristics, represent current versions of code within said client computer and are not currently resident in said client computer, and transmitting said list or information about said list to said client computer; and means for receiving selection from said client computer of one or more of the listed code updates.

2. A server computer as set forth in claim 1 further comprising means for sending address information for the selected code updates to said client computer so that said client computer can obtain said selected code updates from another server computer.

3. A server computer as set forth in claim 1 wherein the identifying means comprises:

program means, executable in said client computer, for obtaining said basic system characteristics of said client computer;

means for sending to said client an address of said program means; and means for receiving said basic system characteristics from said client.

4. A server computer as set forth in claim 1 wherein the sending means sends an address of one of said programs to said client for each of said code updates.

5. A server computer as set forth in claim 1 wherein said information about said list comprises a category designating all updates which are consistent with but not currently resident in said client, and another category designating only critical updates.

6. A server computer as set forth in claim 1 wherein said programs corresponding to the selected code updates are executed again before said selected code updates are installed in said client computer.

7. A server computer for selecting code updates to download to a client computer, said server computer comprising:

means for obtaining basic system information from a client computer;

means for identifying code updates which are consistent with said basic system information;

means for sending to said client computer a recognizer program for each of said identified code updates, each said recognizer program when executed in said client computer determining whether said client computer has a version other than a current version of said code update;

means for receiving results of said recognizer programs and sending to said client computer a list of code updates which are consistent with said client computer, represent current versions of code within said client computer and are not currently resident in said client computer; and means for receiving selection from said client computer of one or more of the listed code updates.

8. A server computer as set forth in claim 7 further comprising means for sending address information of the selected code updates to said client computer.

9. A server computer as set forth in claim 7 wherein said recognizer programs corresponding to the selected code updates are executed again before said selected code updates are installed in said client computer.

10. A server computer for selecting code updates for a client computer, said server computer comprising:

means for sending to said client computer an address of a first program, said first program, executable in said client computer, for obtaining basic system information of said client computer;

means for receiving said basic system information from said client computer;

means for identifying code updates which are consistent with said basic system information of said client computer; and means for sending to said client computer one or more addresses outside of said client computer of one or more respective other programs which execute in said client computer to determine whether said client computer has a version other than a current version of the identified code updates.

11. A server computer as set forth in claim 10 further comprising:

means for receiving results of said other programs, generating a list of code updates which are consistent with said basic system information, represent current version(s) of code within said client computer and are not currently resident in said client computer, and transmitting said list or information about said list to said client computer; and means for receiving selection from said client computer of one or more of the listed code updates.

12. A server computer as set forth in claim 11 further comprising means for sending address information for the selected code updates to said client computer so that said client computer can obtain said selected code updates from another server computer.

13. A server computer as set forth in claim 10 wherein said client computer selects from the identified code updates for installation in said client computer.

14. A server computer as set forth in claim 10 wherein said address of said first program identifies another server computer which contains said first program.

15. A server computer as set forth in claim 10 wherein said one or more addresses identify one or more other server computers which contain said other programs.

16. A method performed by a server computer for selecting code updates for a client computer, said method comprising the steps of:

identifying code update(s) which are consistent with basic system characteristics of the client computer; and sending to said client computer one or more addresses outside of said client computer of one or more respective different programs which can execute in said client computer to determine whether said client computer has a version other than a current version of the identified code update(s).

17. A method performed by a server computer as set forth in claim 16 further comprising the steps of:

receiving results of said programs, generating a list of code update(s) which are consistent with said basic system characteristics, represent current version(s) of code within said client computer and are not currently resident in said client computer, and transmitting said list or information about said list to said client computer.

18. A method performed by a server computer as set forth in claim 17 further comprising the step of receiving selection from said client computer of one or more of the listed code updates.

19. A method performed by a server computer as set forth in claim 18 further comprising the step of sending address information for the selected code updates to said client computer so that said client computer can obtain said selected code updates from another server computer.

20. A method performed by a server computer as set forth in claim 16 further comprising the prior steps of:

sending to said client computer an address of another program, said other program, executable in said client computer, for obtaining information about said basic system characteristics; and receiving said information about said basic system characteristics from said client computer and using said information to identify code update(s) which are consistent with said basic system characteristics of the client computer.

21. A method performed by a server computer as set forth in claim 16 wherein said one or more addresses identify one or more other server computers which contain said program(s).

22. A computer program product for selecting code updates for a client computer, said program product comprising:

a computer readable medium;

first program instruction means for instructing a server computer to send to said client computer an address of a program, said program, executable in said client computer, for obtaining basic system information of said client computer, second program instruction means for instructing said server computer to receive said basic system information from said client computer, third program instruction means for instructing said server computer to identify code updates which are consistent with said basic system information of said client computer; and fourth program instruction means for instructing said server computer to send to said client computer one or more other different programs or respective addresses outside of said client computer of said one or more other different programs which execute in said client computer to determine whether said client computer has a version other than a current version of the identified code update(s); and wherein all of said program instruction means are recorded on said medium.

23. A server computer for selecting code updates for a client computer, said server computer comprising:

means for identifying a plurality of code update(s) which are consistent with basic system characteristics of the client computer; and means for sending to said client computer a plurality of different programs corresponding respectively to said plurality of identified code updates, which programs execute in said client computer to determine whether said client computer has a version other than a current version of the identified code update(s).

24. A server computer for selecting code updates for a client computer, said server computer comprising:

means for identifying code update(s) which are consistent with basic system characteristics of the client computer; and means for sending to said client computer one or more addresses outside of said client computer of one or more respective different programs which can execute in said client computer to determine whether said client computer has a version other than a current version of the identified code update(s).

25. A server computer as set forth in claim 24 further comprising:

means for receiving results of said programs, generating a list of code updates which are consistent with said basic system characteristics, represent current versions of code within said client computer and are not currently resident in said client computer, and transmitting said list or information about said list to said client computer.

26. A server computer as set forth in claim 25 further comprising means for receiving selection from said client computer of one or more of the listed code updates.

27. A server computer as set forth in claim 26 further comprising means for sending address information for the selected code updates to said client computer so that said client computer can obtain said selected code updates from another server computer.

28. A computer program product for selecting code updates for a client computer, said program product comprising:

a computer readable medium;

first program instruction means for instructing a server computer to identify code update(s) which are consistent with basic system characteristics of the client computer; and second program instruction means for instructing said server computer to send to said client computer one or more addresses outside of said client computer of one or more respective different programs which execute in said client computer to determine whether said client computer has a version other than a current version of the identified code update(s); and wherein both of said program instruction means are recorded on said medium.

29. A method for selecting code updates for a client computer, said method comprising the steps of;

a server computer identifying code update(s) which are consistent with basic system characteristics of the client computer;

the server computer sending to said client computer one or more addresses outside of said client computer of one or more respective different programs which can execute in said client computer to determine whether said client computer already has the identified code update(s); and the client computer executing said one or more respective different programs to determine whether said client computer already has the identified update(s).

30. A method as set forth in claim 29 further comprising the step of:

said client computer, based on results of said programs executing in said client computer, reporting to said server computer whether said client computer already has the identified update(s).

* * * * *